United States Patent
Gaertner et al.

(10) Patent No.: US 11,023,352 B2
(45) Date of Patent: Jun. 1, 2021

(54) WEAR MITIGATION IN A DATA STORAGE SYSTEM THROUGH DATA MIGRATION

(71) Applicant: Seagate Technology LLC, Cupertino, CA (US)

(72) Inventors: Mark A. Gaertner, Vadnais Heights, MN (US); Anil Kashyap, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/875,572

(22) Filed: Jan. 19, 2018

(65) Prior Publication Data

US 2019/0227898 A1  Jul. 25, 2019

(51) Int. Cl.
*G06F 3/06* (2006.01)
*G06F 11/34* (2006.01)
*G06F 11/07* (2006.01)
*G06F 11/00* (2006.01)
*G06N 7/00* (2006.01)

(52) U.S. Cl.
CPC ........ *G06F 11/3452* (2013.01); *G06F 3/0616* (2013.01); *G06F 11/008* (2013.01); *G06F 11/0727* (2013.01); *G06N 7/005* (2013.01)

(58) Field of Classification Search
CPC ............. G05B 23/0283; G06F 11/0754; G06F 11/0757; G06F 11/076; G06F 3/0649; G06F 3/0617; G06F 12/0868; G06F 12/0238; G06F 12/7211
USPC ...................................... 714/47.3, 47.2, 47.1
See application file for complete search history.

(56) References Cited

U.S. PATENT DOCUMENTS

| | | | |
|---|---|---|---|
| 6,975,472 B2 | 12/2005 | Stover et al. | |
| 8,854,929 B1 | 10/2014 | Champion et al. | |
| 9,042,047 B1 | 5/2015 | Dube | |
| 9,196,302 B1 | 11/2015 | Kuan et al. | |
| 9,218,849 B1 * | 12/2015 | Trantham | G11B 27/36 |
| 9,390,761 B2 | 7/2016 | Trantham et al. | |
| 9,569,121 B1 | 2/2017 | Rausch et al. | |
| 9,852,754 B1 * | 12/2017 | Martin | G11B 5/5547 |
| 2002/0135922 A1 * | 9/2002 | Smith | G11B 5/5526 |
| | | | 360/69 |
| 2007/0234350 A1 * | 10/2007 | Wang | G06F 9/4411 |
| | | | 717/174 |

(Continued)

*Primary Examiner* — Sarai E Butler
(74) *Attorney, Agent, or Firm* — Hall Estill Attorneys at Law

(57) ABSTRACT

Method and apparatus for distributing wear in a disc stack. A data transducer is used to record data to a data recording surface in the disc stack. Performance statistics are accumulated including a dwell metric value indicative of dwell time of the transducer adjacent a selected radial location and an operational life metric value indicative of accumulated elapsed operation of the transducer. Data are migrated from the selected radial location to a target location within the disc stack responsive to at least a selected one of the dwell metric value or the operational life metric value. In some cases, the dwell metric value may indicate an estimated amount of lubricant disturbance and the operational life operation may indicate operational hours of a heat assisted magnetic recording (HAMR) element. The target location may be on a different data recording surface having an associated transducer with a lower operational life metric value.

20 Claims, 5 Drawing Sheets

(56) References Cited

U.S. PATENT DOCUMENTS

| | | | |
|---|---|---|---|
| 2008/0005464 A1* | 1/2008 | Lubbers | G06F 12/0804 |
| | | | 711/113 |
| 2008/0100953 A1* | 5/2008 | Sosseh | G11B 5/5582 |
| | | | 360/78.04 |
| 2011/0043941 A1* | 2/2011 | Champion | B82Y 10/00 |
| | | | 360/59 |
| 2013/0142074 A1* | 6/2013 | Tiwari | H04W 72/06 |
| | | | 370/252 |
| 2014/0013052 A1 | 1/2014 | Sawin et al. | |
| 2015/0153571 A1* | 6/2015 | Ballard | H04W 76/10 |
| | | | 345/8 |
| 2016/0162205 A1* | 6/2016 | Grimsrud | G06F 3/0616 |
| | | | 711/103 |
| 2017/0162222 A1 | 6/2017 | Matousek et al. | |
| 2018/0090213 A1* | 3/2018 | Peterson | G11C 16/26 |
| 2018/0352384 A1* | 12/2018 | Rehman | H04W 4/029 |
| 2019/0019212 A1* | 1/2019 | Akselrod | G06Q 30/0242 |

* cited by examiner

WEAR MITIGATION IN A DATA STORAGE SYSTEM THROUGH DATA MIGRATION

SUMMARY

Various embodiments of the present disclosure are generally directed to a method and apparatus for managing a data storage system that utilizes moveable data transducers adjacent rotatable data recording media.

In some embodiments, a data transducer is used to record data to a data recording surface of a disc stack. Performance statistics are accumulated including a dwell metric value indicative of relative dwell time of the transducer adjacent a selected radial location on the data recording surface and an operational life metric value indicative of accumulated elapsed operation of the transducer. Data are migrated from the selected radial location to a different, target location within the disc stack responsive to at least a selected one of the dwell metric value or the operational life metric value exceeding a selected predetermined threshold. In some cases, the dwell metric value may indicate localized lubricant disturbance on the data recording surface, and the operational life metric value may indicate total accumulated operational hours of a heat assisted magnetic recording (HAMR) system.

DETAILED DESCRIPTION

Figure 1:
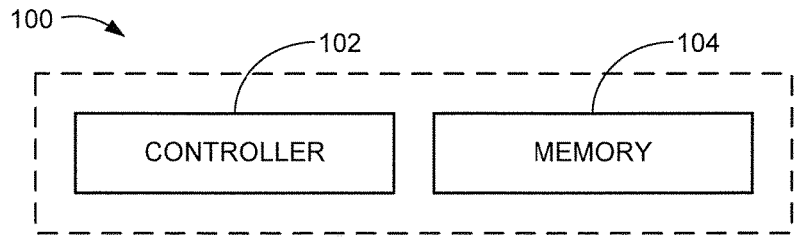
FIG. 1 is a functional block diagram of a data storage device constructed and operated in accordance with various embodiments of the present disclosure.

The present disclosure is generally directed to data storage systems, and more particularly to mitigating wear disturbance in a data storage system that employs a disc stack having at least one data recording surface.

Data storage devices store and retrieve data in a fast and efficient manner. Some data storage devices employ one or more data recording media (discs) which are arranged into a disc stack for rotation at a high rotational velocity. An array of data transducers (heads) are supported adjacent the disc surface(s) to write and read data. Each head is aerodynamically flown in close proximity to the associated disc surface using circulating atmospheric currents (e.g., air, helium, etc.) established by high speed rotation of the disc stack.

Heat assisted magnetic recording (HAMR) generally refers to the use of electromagnetic energy to assist in the magnetic recording of data. A HAMR system generally includes a source of electromagnetic radiation (EMR), such as but not limited to a laser diode. The source locally heats the magnetic recording medium to a temperature near or above the Curie temperature of the magnetic material. In this way, the magnetic coercivity of the material will be significantly lowered during a write operation, allowing a magnetic field from a magnetic write element to write a desired magnetization pattern to the media. HAMR systems can take any number of forms including microwave assisted magnetic recording (MAMR) systems, etc.

Some HAMR systems utilize a near field transducer (NFT) to assist in the focusing of the electromagnetic energy onto the magnetic recording media. Generally, NFTs tend to wear out faster than other elements in the system. Empirical evidence suggests that NFTs follow the well known reliability bath-tub curve; many initial failures (largely screened during manufacturing), a relatively long stable period of random failures, followed by a sharp increase in end of life failures.

NFT failures are often a function of total operational hours and laser power used by the HAMR system. Operational hours may be expressed using a metric sometimes referred to as WPOH (write power on hours), or some other suitable metric. The WPOH value may be an accumulated total on-time, or may be an adjusted value to account for differences in laser power settings, recording locations, etc.

With the advent of HAMR and reduced HMS (head-media spacing), data storage devices can be susceptible to reliability issues relating to excessive access by a head to a particular area of the disc media. For HAMR, one issue is that the heads have limited WPOH capability, so excessive write accesses using a subset of the total number of available heads can cause those heads to fail more quickly as compared to if a uniform distribution of write accesses were used. For HMS, concentrated read/write accesses or passive dwell times to a small region of the disc media can disrupt the thin lubrication (lube) layer that protects the heads and the media from inadvertent contact events. If sufficiently pronounced, lube degradation and displacement issues can result in read/write errors and, ultimately, total device failures. Even for non-HAMR based heads, excessive utilization of one or a subset of the heads can lead to premature failure of those heads, leading to a benefit of extended life and improved operation through head-based wear leveling.

Accordingly, various embodiments of the present disclosure are generally directed to an apparatus and method for mitigating these and other wear and dwell time related effects. As explained below, some embodiments are directed to a data storage device that employs a heat assisted magnetic recording (HAMR) system with a transducer having a source of electromagnetic radiation (EMR) configured to assist in the magnetic writing of data to an associated data recording surface.

A mitigation circuit monitors operation of the data storage device including by monitoring and evaluating WPOH distributions across the various heads and dwell time performance of the individual heads. The mitigation circuit periodically transitions from a normal mode to a data migration mode based on either or both of these factors reaching a predetermined threshold. The data migration mode is applied to a particular range of data affected by the wear condition so that data within that range will be subjected to specialized processing for a time, while other ranges of data will continue to be subjected to normal processing. Thus, it will be understood that "data migration mode" is data set specific. Multiple data sets may be concurrently subjected to data migration mode processing at the same time, while remaining data sets in the system remain unaffected.

During the migration mode, data may be migrated from a first memory location, also referred to as a wear location, to a second memory location, also referred to as a target location. In some cases, data are migrated from a first memory location associated with a head having a first WPOH value to a second memory location having a head with a second WPOH value. As discussed below, WPOH values as define herein describe the amount of usage that has occurred to date. Other configurations of metrics can be used such as relative amounts of estimated remaining life, etc. Generally, a term "operational life metric" is used to generally describe a condition of a head relating to the amount of operational usage that has occurred and would cover these and other available metrics (e.g., accumulated time of operation thus far, estimated amount of remaining life, total accumulated joules heating applied to the head, etc.).

Thus, in some embodiments the data are migrated from a first head having a relatively worse operational life metric to a second head having a relatively better operational life metric in order to level load the respective usage of the heads. This is not necessarily required, however; in other cases, both the wear location and the target location may reside on the same data recording surface serviced by the same head, so no operational life metric wear is provided.

Regardless, the second memory location is a physical location on the associated medium surface having low measured or estimated lube disturb. Other factors may be utilized in selecting the target destination combination (head+location), including the access history of the data, data transfer requirements, etc.

While a physical movement of data stored at the wear location to the target location is contemplated, such is not necessarily required. In other embodiments, no data are migrated or swapped on the basis that no valid data remain stored at the wear location. Instead, the map structure that describes the various blocks is re-vectored and future data storage for the LBA range occurs at the newly designated location. Examples include empty LBA ranges from a SATA TRIM operation, a reset write pointer operation, etc.

In some cases, the data (and/or LBA ranges) from the two locations are swapped so that relatively hot data in the first location are moved to the second location, and relatively cold data in the second location are moved to the first location. In other cases, the relatively hot data (and/or LBA ranges) in the first location are moved to an available spare location, and a new spare location may be designated. Other migration sequences are contemplated as well, including migration of data from the first memory location to another memory, such as a media cache location, a solid-state memory (e.g., flash), etc.

The data may be arranged in fixed size host addressable blocks (sectors), such as 512 bytes, 1024 bytes, etc. These addressable sectors may in turn be grouped into larger multi-sector blocks or sets of data, such as 256 MB blocks in accordance with an existing data block storage standard (e.g., T10/T13 ISO standard, etc.). A virtualized mapping approach is used to maintain a map structure that identifies the locations of the various sets of data, and the map structure is updated as required to accommodate the data migration operations.

Various methodologies can be used to detect both operational metric distributions and dwell time disturbances. For dwell times, one method can utilize a narrow band dwell monitor circuit that estimates or computes a free lube distribution based on a number of input parameters. Another technique may involve to detect frequently written LBA ranges to enable identification of LBA ranges to move or otherwise change the LBA virtualization. For operational distributions (such as but not limited to WPOH), various techniques can be used including monitoring and calculating individual WPOH values, statistically evaluating a WPOH distribution, etc. Different combinations of these and other techniques can be used to signal the transitioning to the data migration mode. While various embodiments are particularly directed to HAMR-based heads, the techniques disclosed herein can also be utilized to obtain improved wear leveling among a population of non-HAMR based heads.

These and other features and advantages of various embodiments can be understood beginning with a review of FIG. 1 which shows a data storage device 100. The data storage device 100 includes a top level controller 102 and a memory 104. The controller can be a hardware and/or software/firmware based processor circuit that provides top level control for the device. The memory 104 can take any variety of forms. For purposes of the present disclosure, it is contemplated that the memory 104 includes one or more rotatable data recording media (discs) to which data are written using a heat assisted magnetic recording (HAMR) system.

Figure 2:
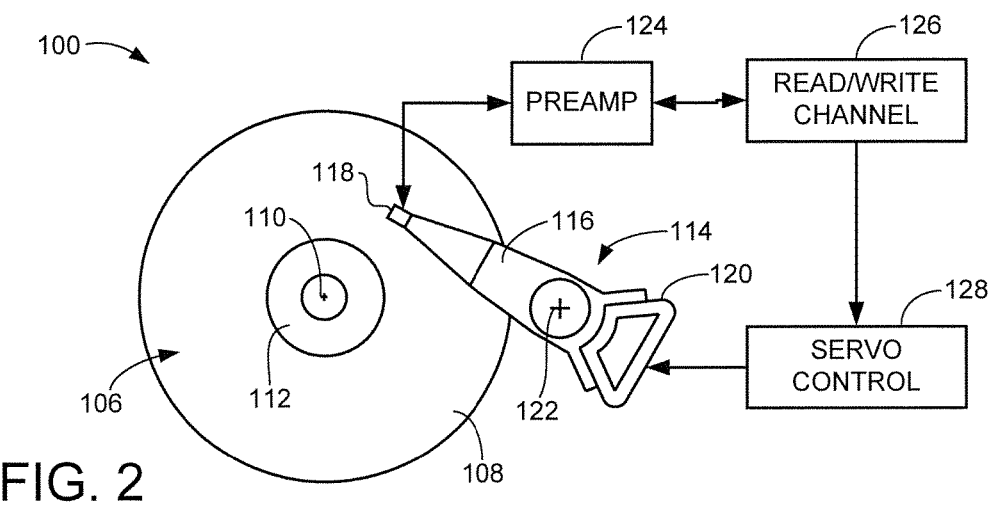
FIG. 2 is a schematic representation of aspects of the data storage device of FIG. 1.

FIG. 2 is a schematic representation of aspects of the storage device 100 of FIG. 1. The device 100 is characterized as a hard disc drive (HDD), although other configurations can be used. The device 100 includes a media stack 106 made up of one or more rotatable magnetic recording media (discs) 108 that are axially aligned for rotation about a central rotational axis 110 by a spindle motor hub assembly 112.

A rotary actuator 114 is mounted adjacent the media stack 106 and includes one or more actuator arms 116 that extend to support a corresponding array of data transducers (heads) 118 adjacent the surfaces of the discs 108. A coil 120 of a voice coil motor, VCM (not separately shown) facilitates rotary movement of the actuator 114 about a pivot point 122 to controllably advance the heads 118 across the media surfaces.

A preamplifier/driver circuit (preamp) 124 provides control signals utilized by the heads 118. The preamp 136 may further include multiplexor (mux) selection logic to enable the individual selection of the various heads as required.

A read/write (R/W) channel 126 provides signal conditioning of input write data during a write operation and readback signal processing of readback signals during a read operation. A servo control circuit 128 receives demodulated servo information written to various tracks on the media surfaces to enable closed loop positional control of the respective heads.

Figure 3:
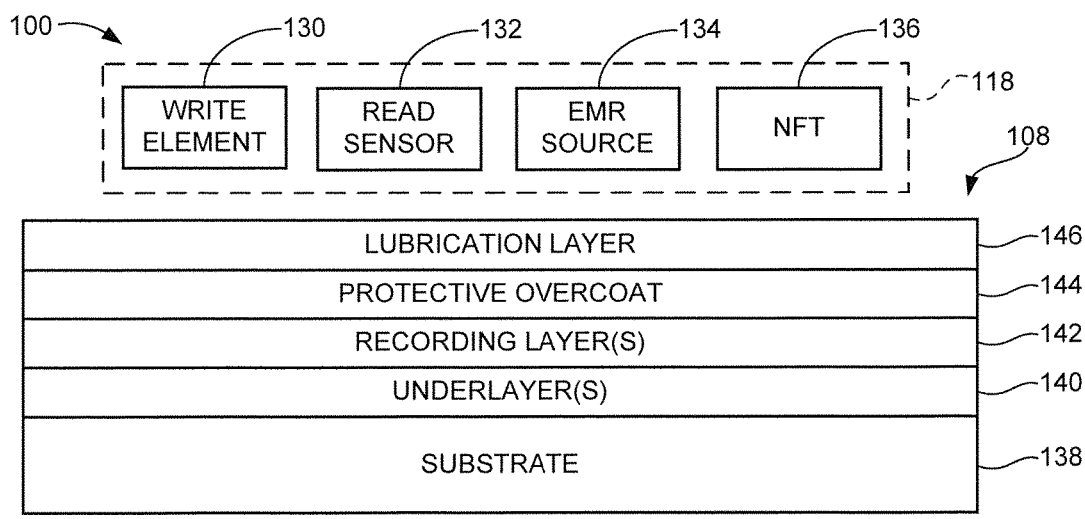
FIG. 3 shows a heat assisted magnetic recording (HAMR) transducer and associated rotatable data recording medium from FIG. 2 in some embodiments.

FIG. 3 is a schematic representation of a selected head-media combination from FIG. 2 in accordance with some embodiments. Other configurations can be used. The selected head 118 includes a number of operational elements including a write element 130, a read sensor 132, an electromagnetic radiation (EMR) source 134 and a near field transducer (NFT) 136. Other elements may be included as well such as a fly height adjustment (FHA) mechanism, a proximity sensor, a microactuator, a laser power detector, etc., but such have been omitted for simplicity of illustration. These elements may be incorporated in or on a slider (not separately designated) having an air bearing surface (ABS) configured to maintain the transducer at a stable fly height above (clearance distance from) a recording surface of the adjacent magnetic recording medium 108.

The medium 108 has a number of layers including a base substrate 138, one or more underlayers 140, one or more magnetic data recording layers 142 and a protective overcoat layer 144, such as a carbon overcoat (COC) layer. Disposed on top of the COC layer 144 is a thin layer of lubricant (lube) 146. The lube layer may be a hydrocarbon based or similar fluid that provides a lubricating layer to reduce the propensity of damage to the head 118 and/or the disc 108 based on inadvertent head-disc contact.

The write element 130 may be a perpendicular magnetic recording element with a coil and pole configuration to direct concentrated magnetic flux into the recording layer 142. The read sensor 130 may take a magnetoresistive (MR) construction and operates to provide a variable electrical resistance in the presence or absence of a magnetic field to sense the previously written magnetic pattern from the recording layer 142.

The EMR source 134 may take the form of a laser diode that applies collated light energy at a selected wavelength to provide localized heating of the recording layer 142 to lower the magnetic coercivity of the layer during a write operation. The light may be transferred by a waveguide or other light conducting channel. The NFT 136 may take the form of a semiconductor based element that can be used to focus the light from the EMR source (e.g., laser diode) onto the medium 108.

Figure 4:
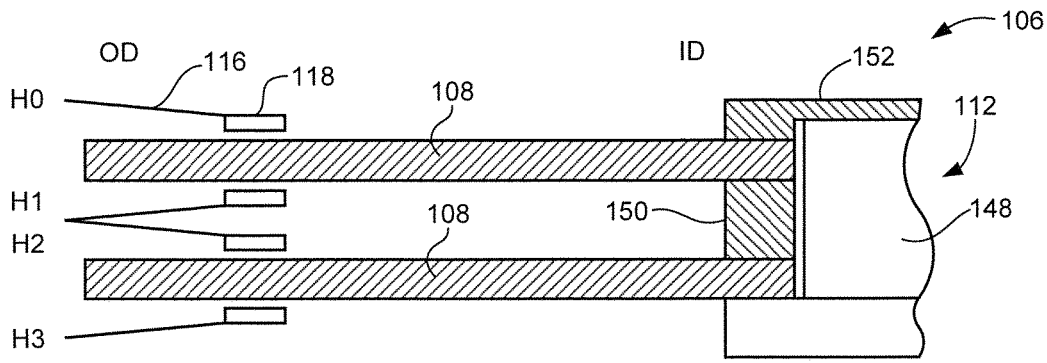
FIG. 4 is a side elevational cross-sectional representation of a disc stack of the data storage device in accordance with some embodiments.

The disc stack 106 from FIG. 2 may employ multiple discs 108. FIG. 4 shows an example configuration of the disc stack with two (2) discs 108 and four (4) heads 118. The discs 108 are axially aligned and mounted to a rotatable spindle motor hub 148 of the hub assembly 112. The discs are spaced using an intervening disc spacer 150 and clamped to the spindle motor hub 148 using a clamp member 152. Each of the four heads 118 accesses a different recording surface of the discs 108 and uses a HAMR system to record data thereto as shown in FIG. 3. For reference, the heads are respectively identified as H0-H3.

It is common in a HAMR system to change the laser power across the stroke of the actuator 114 (FIG. 2) so that different power values are used from the outermost diameter (OD) to the innermost diameter (ID) of the discs. Generally, some HAMR systems operate such that the laser power is higher at the OD as compared to the ID. This change in laser power arises based on a number of factors, including the fact that in constant angular velocity (CAV) recording systems where the discs are rotated at a constant velocity, generally higher data recording frequencies will be used at the OD as compared to the ID. Similarly, different laser power levels may be used for different locations within the disc stack 106. For example, interior heads H1 and H2 may operate at higher temperatures than the outer heads H0 and H3, so lower power levels may be applied to the interior heads.

Figure 5:
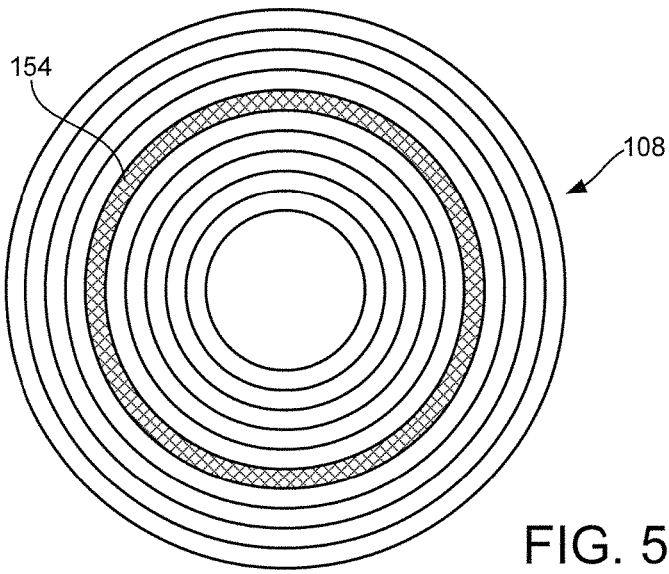
FIG. 5 shows an arrangement of a data recording surface of the data storage media arranged into a plurality of data zones.

FIG. 5 shows an arrangement of a selected recording surface of a disc 108 into a plurality of concentric data zones or regions 154. Each data region 154 comprises a plurality of immediately adjacent data tracks configured to store a selected amount of user data. The data tracks store the data in fixed-sized data sectors, or data blocks. Each data region 154 may correspond to a total common amount of storage capacity, such as 256 MB. This can be useful in certain applications, such as systems configured to conform to a T10/T13 Iso Standard where data are managed as larger multi-sector data blocks. It will be appreciated that FIG. 5 is not drawn to scale, so that many more data regions than are shown can be accommodated on each recording surface. The tracks can take any number of suitable forms including shingled magnetic recording (SMR) tracks, etc.

Figure 6:
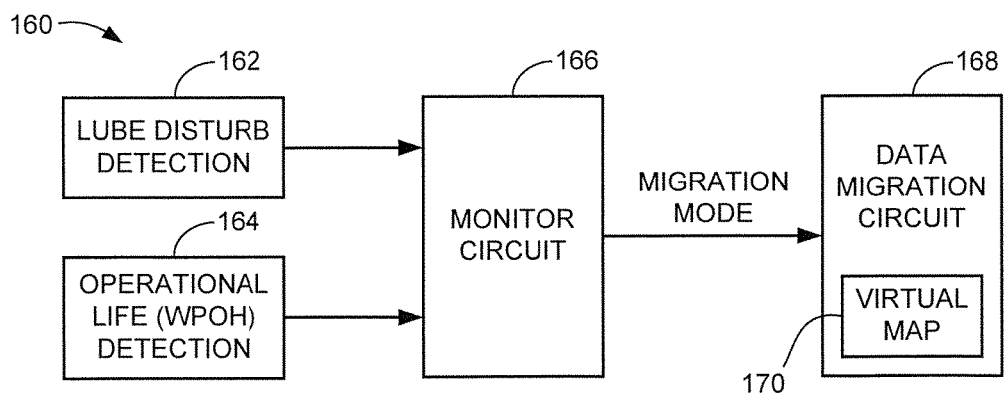
FIG. 6 is a functional block representation of a wear and dwell mitigation circuit in accordance with some embodiments.

FIG. 6 is a functional block representation of a wear and dwell mitigation circuit 160 in accordance with some embodiments. The circuit 160 may form a portion of the controller 102 of the data storage device, and may be realized using hardware circuits and/or one or more programmable processors and associated programming in a local memory.

The circuit 160 includes a number of operational modules including a lube disturb detection circuit 162, a WPOH detection circuit 164, a monitor circuit 166, and a data migration circuit 168. As explained below, the lube detection circuit 162 and the WPOH detection circuit each monitor various parameters to provide indications that an excessive wear and/or dwell condition is present. If so, the monitor circuit 166 transitions from a normal mode of operation to a data migration mode. As noted above, data migration mode is enacted for one or more particular sets of data (e.g., one or more ranges of LBAs, etc.) so that specialized processing is applied to these sets/ranges while normal processing continues to be applied to remaining sets/ranges.

The data migration circuit 168 thereafter operates to perform data migration operations to enhance the level loading of the system. The data migration circuit 168 may utilize and update a virtual map 170, which is a data structure stored in a suitable memory location to identify the locations of the various data blocks in the system.

Figure 7:
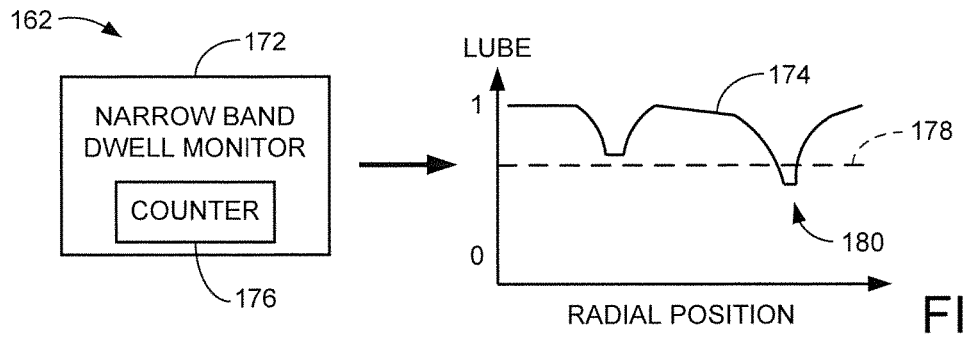
FIG. 7 illustrates a narrow band dwell monitor circuit from FIG. 6.

FIG. 7 illustrates a narrow band dwell monitor circuit 172 which may form a portion of the lube disturb detection circuit 162 of FIG. 6. Other forms of detection can be used. As noted above, maintaining a data head in a relatively localized position (e.g., over a small subset of adjacent tracks) for an extended period of time can cause a lube disturb condition where the normalized thickness of the lubricant is disturbed or displaced. In some embodiments, the circuit 172 uses a mathematical model based on empirical information to predict zones of reduced lubricant thickness, as generally indicated by lubricant thickness curve 174.

The model can use various inputs including the number of recent servo track positions, the number of recent write accesses, the number of recent read accesses, temperature, etc. to estimate a localized change in lubricant thickness. Counter circuitry such as at 176 can be used to accumulate various counts of these and other parameters. A selected threshold value, indicated by dashed line 178, can be utilized to determine that a lube disturb event has taken place at that location if a portion of the calculated curve 174 extends below this threshold line 178, as indicated at region 180. Hence, one manner in which the monitor circuit 166 can signal a transition to the data migration mode is through monitoring the output of the circuit 172. The threshold 178 can be any suitable value, such as but not limited to 0.8 (80% of the normal lube thickness).

Figure 8:
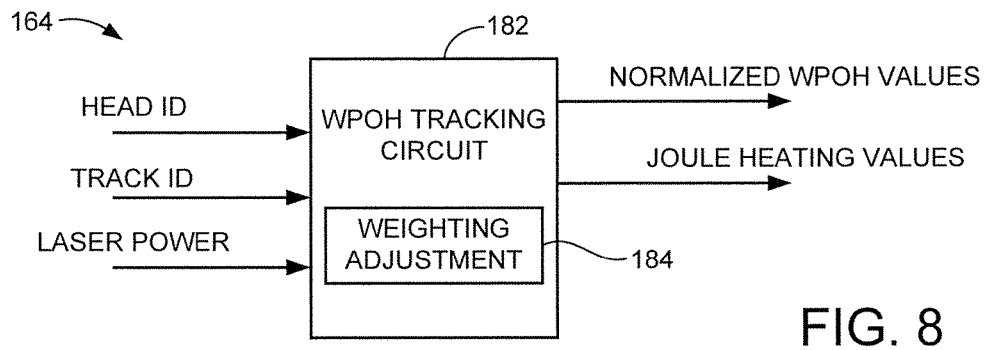
FIG. 8 illustrates a WPOH (write power on hours) monitoring circuit from FIG. 6.

FIG. 8 shows an exemplary WPOH tracking circuit 182 that may form a portion of the WPOH detection circuit 164 of FIG. 6 in some embodiments. Other configurations can be used as desired. Generally, the WPOH tracking circuit 182 can be configured to simply track the total amount of time that each HAMR head 118 has been separately activated. This may be tracked using hours or some other figure of metric, such as total joules of heating per head. This provides a relatively simple "odometer" type metric In other cases, parameters such as location data (e.g., ID v. OD, etc.) and laser power can be provided on a per-head basis to provide a weighted estimate of WPOH or joule heating values for the respective heads using a weighting adjustment block 184.

With regard to scaling WPOH, a first scaling factor, such as 1.0, may be used for intermediate tracks, a second scaling factor such as 0.8 may be used for tracks near the ID, and a third scaling factor such as 1.2 may be used for tracks near the OD. More generally, a variable scaling factor $S(x)$ that varies with respect to radius (x) may be used as follows to provide a normalized wPOH (operational hours) value:

$$\text{Normalized wPOH} = (\text{Actual WPOH})S(x) \quad (1)$$

Since the temperature of the NFT depends on laser power, when the head writes at the OD it is hotter than when it writes at the ID. In other words, one hour of writing at the OD will tend to degrade the NFT more than one hour of writing at the ID. In this formulation, it is the total joule heating of the NFT that matters. The joule heating of the NFT can be defined as:

$$\text{Joule Heating} = (\text{Laser Power (mA)})(\text{WPOH}) \quad (2)$$

There are a number of ways in which joule heating can be tracked, including on a per track, per sector, per wedge and/or per zone basis. Regardless, the weighting adjustment circuit 184 can maintain total joule heating in the device 100 per head as desired. For reference, wear figures of merit such as WPOH, joule heating, remaining life, etc., whether for HAMR or non-HAMR heads, are generally referred to herein as operational life metrics. Threshold values can be applied by a threshold circuit 186 as required to signal a wear condition.

Figure 9:
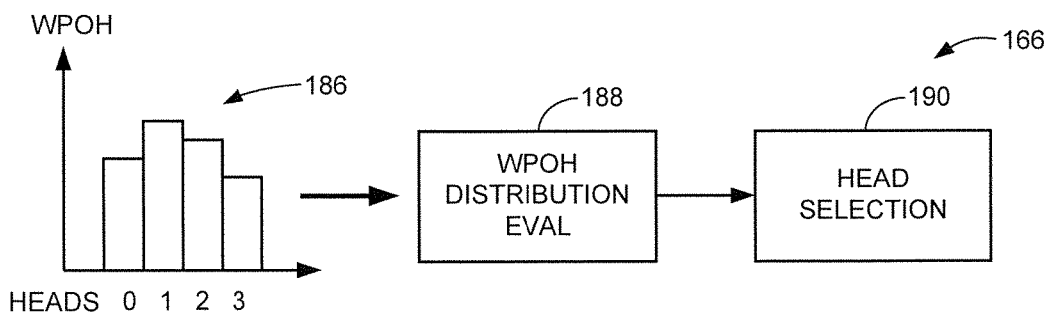
FIG. 9 illustrates a WPOH evaluation circuit from FIG. 6.

FIG. 9 shows further aspects of the monitor circuit 166 of FIG. 6 in some embodiments. Generally, a distribution of existing operational life metric values 186 is obtained for a population of heads, as represented by (in this case) WPOH values for heads 0-3. The distribution may be sorted as shown to resemble a Gaussian distribution. A WPOH distribution evaluation circuit 188 evaluates the distribution to gain a measure of the amount of variation within the distribution. In one example case, a standard deviation ($\sigma$) is calculated for the distribution and compared to a maximum threshold. In another example case, a simple max-min calculation is made (e.g., subtracting the minimum value from the maximum value and comparing the difference to a threshold). At such time that the evaluation circuit 188 determines that there is too much variation in the operational life metric values for the respective heads, the head(s) having the highest metric value is/are selected for processing (data migration) by a head selection circuit 190.

Figure 10:
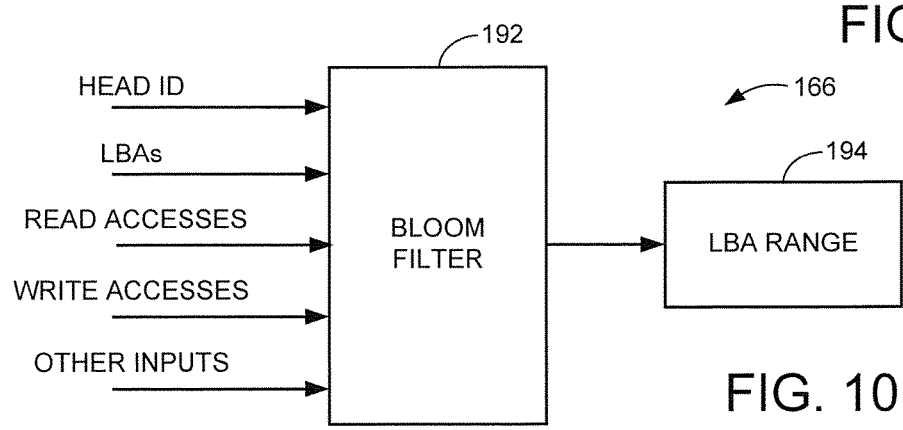
FIG. 10 illustrates a bloom filter from FIG. 6.

In yet another embodiment, the monitor circuit 166 can employ a bloom filter 192 as depicted in FIG. 10. The bloom filter 192 can be tuned based on various input parametric values to detect a lubricant disturbance and/or excessive wear condition for a particular range of LBAs. It will be appreciated that the various examples of FIGS. 7-10 are merely illustrative and are not limiting. In some cases, certain combinations can be used to declare a data migration mode, such as the narrow band dwell monitoring of FIG. 7 and the bloom filter of FIG. 10, etc.

Figure 11:
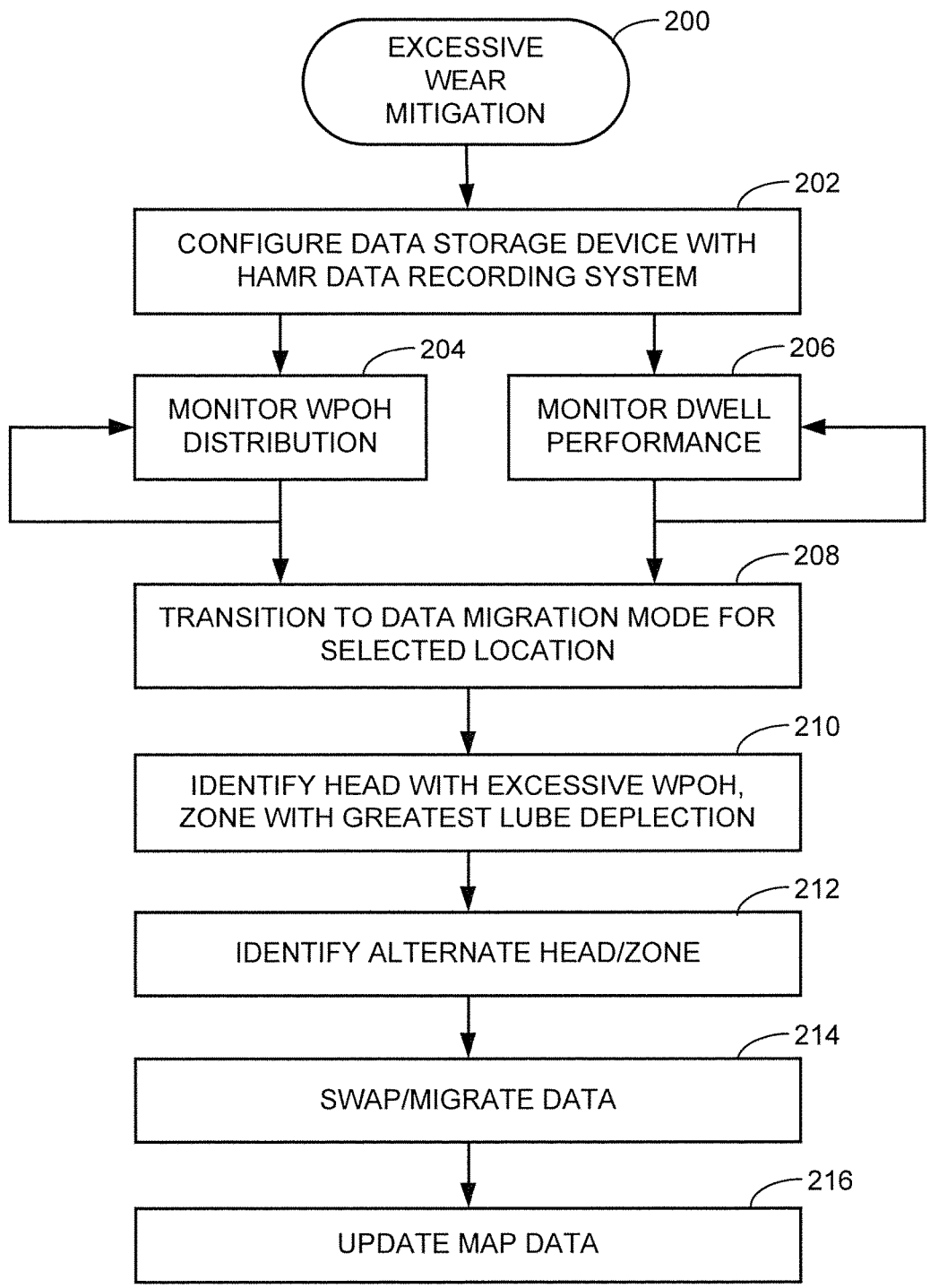
FIG. 11 is a flow chart for an excessive wear and dwell mitigation routine illustrative of steps carried out by the circuit of FIG. 6 in accordance with some embodiments.

FIG. 11 provides a flow chart for an excessive wear mitigation routine 200, illustrative of steps that may be carried out by the circuit 160 of FIG. 6 in some embodiments. As noted above, the various steps may represent firmware programming steps stored in a memory location utilized by one or more programmable processor circuits of the controller 102. Additionally or alternatively, various hardware based circuits may be employed as well as electrical/mechanical systems (e.g., the read/write channel, the servo circuit, etc.) to execute these various steps. The routine is merely illustrative and can be modified as required depending on the requirements of a given application.

At step 202, an example data storage device such as 100 is configured with an array of data transducers (heads) 118 adjacent rotatable data recording surfaces. It is contemplated albeit not required in the present example that the heads are HAMR-based heads as illustrated in FIG. 3.

During normal operation of the storage device, various parameters are monitored including a WPOH distribution for the heads at step 204 and dwell performance at step 206. As noted above, the WPOH distribution monitoring is generally directed to determining that one or a subset of the heads has excessive operational usage metrics as compared to the other remaining heads, and the dwell performance monitoring is generally directed to determining whether a selected head, whether active or not, has been maintained too long in a particular location sufficient to indicate a potential lubricant disturbance condition. For convenience, both of these types of conditions may be collectively referred to as a "wear" condition.

The concurrent monitoring of steps 204 and 206 continues until such time that one or more monitoring circuits indicate a wear condition has arisen, at which point the system transitions from the normal mode to the data migration mode for the data associated with the detected wear condition, step 208. At step 210, the system operates to identify a selected head from the population of heads in the system with the greatest WPOH (or other operational life metric value), as well as, as needed, the zone on the associated media recording surface for that head that has the greatest level of lube depletion. This is also sometimes referred to as a first zone or a hot zone.

An alternative head/zone combination is next selected at step 212, also referred to as a second zone or a cold zone. This constitutes the target location to receive migrated data (or change in LBA virtualization if no data are physically migrated). It is noted at this point that the system not only needs to select the alternate zone (target location) but also needs to select the zone from which to migrate (wear location). The magnitude of wear detection may not be sufficient to target specific data. For example, if WPOH for the selected head is excessive, not all data stored on the associated data recording surface will be migrated. Instead, only the subset of data sufficiently affected by lube depletion will be migrated. This is where the bloom filter or alternate techniques can be used to provide the best data (e.g., LBA range or ranges) for migration.

A data swap/migration operation is carried out at step 214 to at least migrate the data from the first zone to the second zone. Depending on the nature of the data migration operation, cold data from the second zone may be concurrently moved to the first zone as well. Once the data migration operation has been carried out, map data such as the virtualized map 170 (FIG. 6) is updated to reflect the new main store data locations for the respective data sets.

Figure 12A:
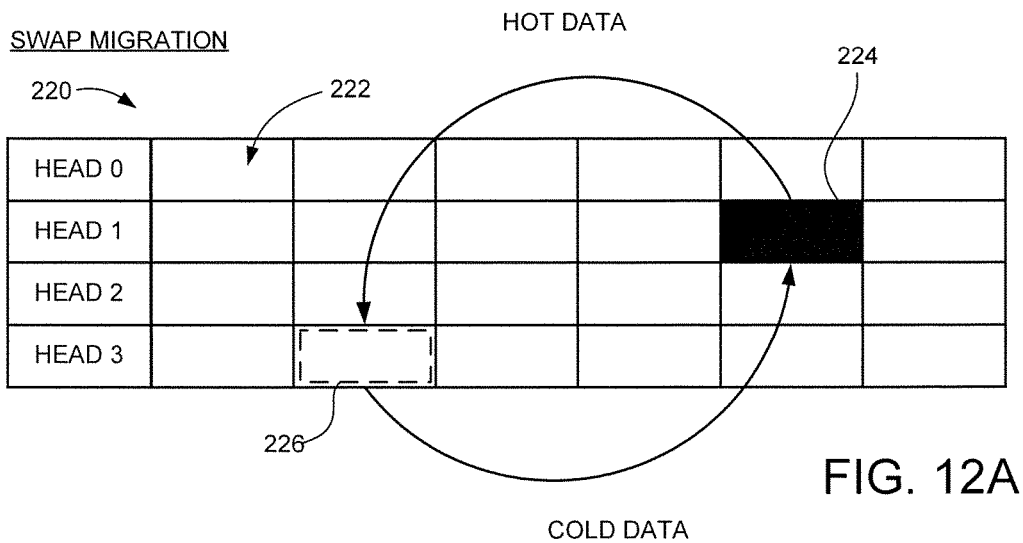
FIG. 12A shows a data migration operation to swap data between different active zones on the media in some embodiments.
Figure 12B:
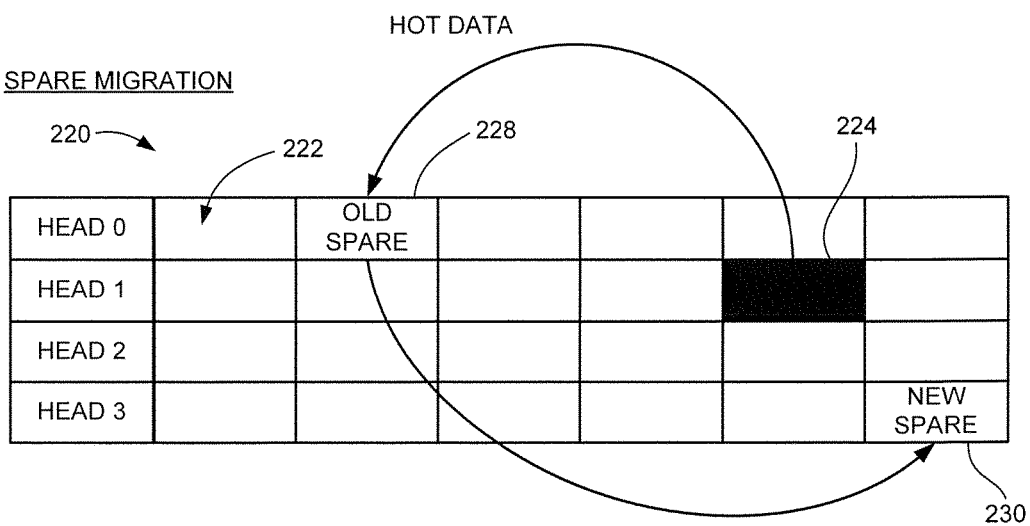
FIG. 12B shows a data migration operation to swap data between an active zone and a spare zone on the media in some embodiments.

FIGS. 12A and 12B illustrate different data migration operations that may be carried out in accordance with the routine 200 of FIG. 11. FIG. 12A describes a swap migration operation, while FIG. 12B describes a spare migration operation.

In each case, a data map structure 220 is presented made up of a number of relatively large data blocks 222. Each data block 222 may correspond to the respective data zones 154 in FIG. 5 and may represent, for example, a large amount of logically contiguous (e.g., LBA sequential) data sectors to provide a total amount of data storage such as 256 MB of data. Each row of the blocks 222 represents the data blocks for one of the associated heads 0-3. The monitor circuit 160 may operate to maintain a separate set of parameters for each of the respective blocks 222.

A selected data block 224 for head 1 is shown in solid black, indicating that this particular block of data are identified as hot data that require migration to a new location. This corresponds to the first zone that is selected at step 210 in FIG. 11. A target block 226 with a relatively low amount of wear is selected as the second zone. This may represent the least disturbed zone for the head (in this case, head 3) having the least amount of operational life wear. Other factors may be taken into account when selecting the target (second) zone, however, including radial location, the priority of the migrated data, etc.

Regardless, once the respective first and second zones 224, 226 have been selected, the storage device controller 102 directs a respective reading out of the data sets and a data swap so that the hot data from zone 224 are migrated to zone 226, and the cold data from zone 226 are migrated to zone 224. The virtual map is updated to reflect these new memory locations for these respective data sets.

FIG. 12B uses generally the same map structure 220 but is provided with one or more spare locations, such as spare locations 228 and 230. The spare locations are overprovisioned memory locations that are not initially used to store user data, and are therefore available to receive data as required. It is contemplated that each head may be provided with at least one spare block, and additional spare blocks can be allocated as necessary. Hence, using the spare migration operation of FIG. 12B, the hot data from block 224 are migrated to "old" spare block 228, and a "new" spare block 230 may be selected for subsequent use during the next migration.

It will now be appreciated that monitoring multiple parameters relating to wear in a proactive manner can result in improved data reliability and availability. While various embodiments have been disclosed that utilize HAMR heads to level load operational life metrics, similar operational life level loading can be used for other configurations including non-HAMR heads, etc. Similarly, other dwell related factors apart from lubricant disturbance can be used to trigger wear mitigation as required by the requirements of a given application.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
  recording data to a data recording surface in a disc stack using a data transducer;
  accumulating a succession of operational life metric values indicative of accumulated elapsed operation of the data transducer;
  generating a distribution of the operational life metric values;
  evaluating a total amount of variation within the distribution of the operational life metric values; and
  migrating data from a selected radial location to a target location within the disc stack responsive to the total amount of variation within the distribution of the operational life metric values exceeding a selected operational life threshold.

2. The method of claim 1, further comprising accumulating a dwell metric value indicative of relative dwell time of the data transducer adjacent the selected radial location on the data recording surface, wherein the dwell metric value comprises an estimate of lubricant disturbance of a lubricant layer on the data recording surface adjacent the selected radial location, and migrating data from the selected radial location responsive to the dwell metric value exceeding a selected dwell metric threshold.

3. The method of claim 1, wherein the operational life metric value comprises a total number of operational hours associated with operation of the data transducer in writing data to the data recording surface or an estimated total number of remaining operational hours during which the data transducer can continue to reliably write data to the data recording surface.

4. The method of claim 1, wherein the data recording surface is a first data recording surface and the data transducer is a first data transducer, and wherein the target location is disposed on a different, second data recording surface accessed by a second data transducer.

5. The method of claim 4, wherein the first and second data transducers are characterized as heat assisted magnetic recording (HAMR) heads each having a laser diode and a near field transducer (NFT) which cooperate to irradiate localized regions of the respective first and second data recording surfaces with electromagnetic radiation as an associated magnetic write element in each of the respective first and second data transducers applies a magnetic write field to the localized region to record data thereto, wherein the operational life metric value represents a write power on hour (WPOH) value, and wherein the first data transducer has a higher WPOH value as compared to the second data transducer.

6. The method of claim 1, wherein the data migrated from the selected radial location to the target location comprises a set of hot data, and the migrating step further comprises concurrently migrating a set of cold data from the target location to the selected radial location, the set of hot data having a host access rate that is higher than a host access rate of the set of cold data.

7. The method of claim 1, wherein the target location comprises an overprovisioned spare location that does not store user data at the time the data are migrated from the selected radial location to the target location.

8. The method of claim 1, further comprising maintaining a map as a data structure in a memory location which associates logical addresses of user data sectors to physical locations within the disc stack, and updating the map to reflect the migration of the data migrated to the target location.

9. The method of claim 1, wherein the target location comprises a second selected radial location on the data recording surface non-adjacent to the selected radial location.

10. An apparatus comprising:
a disc stack comprising at least one data recording surface;
a data transducer configured to write data to the data recording surface; and
a wear mitigation circuit configured to accumulate a dwell metric value indicative of dwell time of the data transducer adjacent a selected predefined radial zone of a first plurality of immediately adjacent data tracks of the data recording surface and an operational life metric value indicative of accumulated elapsed operation of the data transducer, and to migrate data from the selected radial zone to a target predefined zone of a different second plurality of immediately adjacent data tracks within the disc stack responsive to both the dwell metric value exceeding a first predetermined threshold and the operational life metric value exceeding a different, second predetermined threshold, the dwell metric value based on a total number of data write accesses carried out by the data transducer to the selected radial zone.

11. The apparatus of claim 10, wherein the data recording surface is a first data recording surface and the data transducer is a first data transducer, wherein the target location is disposed on a different, second data recording surface accessed by a second data transducer, wherein the first and second data transducers are characterized as heat assisted magnetic recording (HAMR) heads each having a laser diode and a near field transducer (NFT) which cooperate to irradiate localized regions of the respective first and second data recording surfaces with electromagnetic radiation as an associated magnetic write element in each of the respective first and second data transducers applies a magnetic write field to the localized region to record data thereto, wherein the operational life metric value represents a write power on hour (WPOH) value, and wherein the first data transducer has a higher WPOH value as compared to the second data transducer at the time that the data are migrated to the second data recording surface.

12. The apparatus of claim 11, wherein the wear mitigation circuit comprises:
a dwell monitor circuit configured to accumulate first and second dwell metric values for the respective first and second data transducers indicative of relative dwell times adjacent associated locations on the first and second data recording surfaces;
an operational life monitor circuit configured to accumulate first and second operational life metric values indicative of accumulated elapsed operation of each of the first and second data transducers;
a monitor circuit configured to compare the first and second dwell metric values to a first threshold and to compare the first and second operational life metric values to a second threshold; and
a data migration circuit which migrates the data from the selected location to the target location based on both a relative difference between the first and second dwell time values and a relative difference between the first and second operational life metric values.

13. The apparatus of claim 10, wherein the dwell metric value comprises an estimate of localized lubricant disturbance of a respective first lubricant layer on the data recording surface at the selected radial location, and the operational life metric value comprises a total number of operational hours associated with the data transducer.

14. The apparatus of claim 10, wherein the data transducer comprises a write element and an electromagnetic radiation (EMR) source of a heat assisted magnetic recording (HAMR) system to direct electromagnetic radiation to the first data recording surface during writing of data by the write element, and the operational life metric value indicates a total accumulated amount of time during which the EMR source has been activated.

15. The apparatus of claim 10, wherein the wear mitigation circuit further updates a map as a data structure in a memory responsive to the migration of the data to the target location.

16. The apparatus of claim 10, wherein the wear mitigation circuit is further configured to accumulate a succession of operational life metric values indicative of accumulated elapsed operation of the data transducer to generate a distribution of the operational life metric values, to evaluate a total amount of variation within the distribution of the operational life metric values, and to migrate the data from the selected radial location to a target location within the disc stack responsive to the total amount of variation within the distribution of the operational life metric values exceeding a selected operational life threshold.

17. The apparatus of claim 10, wherein the data migrated from the selected radial location comprises a set of hot data, and the wear mitigation circuit further concurrently migrates a set of cold data from the target location to the selected radial location on the data recording surface.

18. The apparatus of claim 10, wherein the data recording surface is a first data recording surface on a first rotatable disc of the disc stack, and wherein the target location is disposed on a second data recording surface on a second rotatable disc of the disc stack.

19. A data storage device, comprising:
a disc stack comprising at least one data recording surface;
a data transducer configured to write data to the data recording surface; and
a wear mitigation circuit configured to accumulate a succession of operational life metric values indicative of accumulated elapsed operation of the data transducer to generate a distribution of the operational life metric values, to evaluate a total amount of variation within the distribution of the operational life metric values, and to migrate data from a selected radial location to a target location within the disc stack responsive to the total amount of variation within the distribution of the operational life metric values exceeding a selected operational life threshold.

20. The data storage device of claim 19, wherein the wear mitigation circuit is further configured to accumulate a dwell metric value indicative of relative dwell time of the data transducer adjacent the selected radial location on the data recording surface, and to migrate data from the selected radial location responsive to the dwell metric value exceeding a selected dwell metric threshold, wherein the dwell metric value comprises an estimate of lubricant disturbance of a lubricant layer on the data recording surface adjacent the selected radial location.

* * * * *